United States Patent [19]

Tsuzurahara et al.

[11] Patent Number: 4,984,129
[45] Date of Patent: Jan. 8, 1991

[54] THROUGH-TYPE CAPACITOR

[75] Inventors: Mamoru Tsuzurahara; Ichiro Ohara, both of Mobara, Japan

[73] Assignee: Hitachi, Ltd., Tokyo, Japan

[21] Appl. No.: 495,763

[22] Filed: Mar. 19, 1990

[30] Foreign Application Priority Data

Mar. 20, 1989 [JP] Japan .................................. 1-66143

[51] Int. Cl.$^5$ .............................................. H01G 3/28
[52] U.S. Cl. ................................................... 361/302
[58] Field of Search ................................. 361/302, 540

[56] References Cited

FOREIGN PATENT DOCUMENTS 304611 12/1988 Japan .................................... 361/302

Primary Examiner—Donald A. Griffin
Attorney, Agent, or Firm—Antonelli, Terry, Stout & Kraus

[57] ABSTRACT

The present invention relates to a through-type capacitor having a cylindrical dielectric and a through terminal inserted into the former.

The characteristics of the capacitor of the present invention reside in that the through terminal inserted into a through-hole drilled in the dielectric is in the form of a metallic pipe provided with a plurality of slits at equal intervals and the parts of the metallic pipe separated by the slits are soldered to a metallized inner wall surface of the through-hole serving as an electrode.

With the above structure, the capacitor of the present invention has the advantages that since the metallic pipe having a plurality of slits is used as a through terminal, the thermal stress and the bending force applied on the dielectric at the time of thermal expansion of the terminal due to a temperature change are sharply reduced and the terminal can be easily manufactured without requiring much time and labor for coating a solder resist on the terminal as has been the case with the prior art technique.

3 Claims, 1 Drawing Sheet

THROUGH-TYPE CAPACITOR

BACKGROUND OF THE INVENTION

1. Field of the Invention

The present invention relates to a through-type capacitor in which a terminal inserted into and fixed to a dielectric material does not give a large mechanical stress on the dielectric material in case it is thermally expanded due to ambient temperature change.

2. Description of Prior Art

A capacitor, in which a through hole is provided to an almost cylindrical dielectric material in parallel with a cylindrical axis, the internal circumferential side wall surface of the through hole and the external circumferential side wall surface of the dielectric material are respectively metallized to form electrodes, a stepped portion is provided to the external circumferential side wall surface of dielectric material by changing the diameter at the intermediate part of side wall surface, this stepped portion is engaged with and supported by a hole bored to a metal plate for an electrode to form one electrode, a metal conductor is inserted into the through hole and this conductor is soldered to the metallized electrode surface on the internal circumferential side wall surface of the through hole to form the other electrode, is currently used, for example, in the microwave noise preventing filter of a magnetron as the through-type or window type capacitor. In order to alleviate application of a stress due to difference of thermal expansion coefficients of metal and dielectric material resulting from ambient temperature changes to the area between the external surface of a through terminal consisting of a metal conductor to be inserted into the dielectric material and the internal surface of the through hole in the dielectric material of such a through-type capacitor, the inventors of the present invention have filed the methods in the patent application Nos. 62-139735 and 62-157636. According to such methods, it has been proposed that solder resist is partially coated on the circumference of the through terminal inserted into the dielectric material and opposed to the metallized surface of dielectric material in view of avoiding the soldering of the external surface of the through terminal to the entire circumference of internal surface of the through hole in the dielectric material or that a cross section of the dielectric material in engagement with the through terminal is shaped to be rectangular or star-shaped.

SUMMARY OF THE INVENTION

The prior art explained above includes difficulty that the step for coating the solder resist is necessary and the through terminal itself is still insufficient in flexibility.

It is therefore an object of the present invention to provide a highly reliable through-type capacitor which does not require the steps for coating the solder resist, ensures easy formation of a through terminal and remarkably alleviates thermal stress and bending force to be applied on the dielectric material.

In order to achieve the abovementioned object, the present invention proposes a through-type capacitor providing a through hole in almost cylindrical dielectric material in parallel to the axis thereof and forming electrodes by respectively metallizing the internal circumferential side wall surface of the through hole and external circumferential side wall surface of the dielectric material, wherein a hollow metal pipe is used as a through terminal to be inserted into the through hole, a plurality of slits are provided with an equal interval in the circumferential direction in the metal wall surface of the pipe to be inserted into the through hole and the metal surface of the pipe between adjacent slits is respectively soldered to the electrode of the internal circumferential side wall surface of the through hole.

With such a structure, since the through terminal is formed by a hollow metal pipe and a plurality of slits are formed with an equal interval in the circumferential direction in the metal pipe wall to be inserted into the dielectric material, flexibility to the bending force increases. Moreover, since the soldering area of the dielectric material is divided by the slits, thermal stress due to temperature change of the capacitor is also remarkably eased.

Moreover, the soldering between the through terminal and the metallized internal wall surface of the through hole exists in a plurality of areas with almost an equal interval in the circumference of the terminal. Therefore, the space between soldered areas is comparatively small and it is effective, as the filter, to prevent leak of high frequency waves of extremely short wavelengths from a magnetron used in the microwave oven.

There and other objects and features of the present invention will become apparent from the following description taken in conjunction with the preferred embodiments thereof with reference the accompanying drawings.

DETAILED DESCRIPTION OF THE INVENTION

Figure 1:
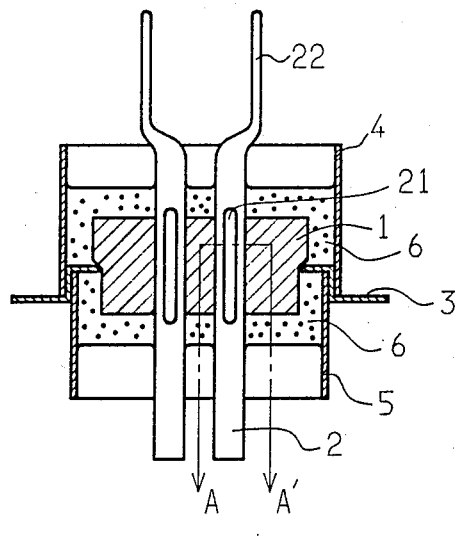
FIG. 1 is a sectional view of side elevation of an embodiment of the present invention.
Figure 2:
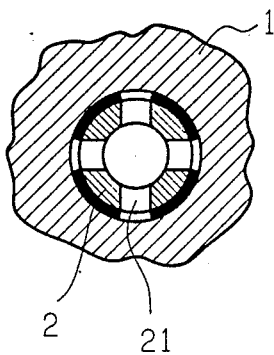
FIG. 2 is a sectional view along the line A—A' in FIG. 1.

FIG. 1 is a sectional view of a side elevation of an embodimant of the present invention. The reference numeral 1 designates an almost cylindrical ceramic dielectric material (for example, strontium titanate), with its external circumferential side wall surface and the internal circumferential side wall surface of a through hole provided therein respectively metallized by nickel plating to form a capacitor providing both electrodes on the internal and external circumferential side wall surfaces. A through terminal 2 which will become one electrode terminal is inserted into the through hole of dielectric material 1 and a stepped portion changing the diameter of the external circumferential side wall surface of dielectric material 1 is caused to engage with the hole of grounding plate 3 as the other electrode to support the plate. These are soldered for connection. Thereafter, the external cases 4, 5 consisting of an insulator are engaged with grounding plate 3 and a filling resin 6 is supplied and hardened to improve withstand voltage. Thereby, a through-type capacitor can be formed. FIG. 2 is a sectional view along the line A—A' in FIG. 1. The through terminal 2 is formed by a hollow pipe and provides a plurality of slits 21 in the axial direction of a pipe. In the case of this figure, four slits are provided but the number of slits is not limited.

The slit 21 is dividing the soldered area between the dielectric material 1 and through terminal 2. To obtain reliable effect of slits, the length of slits in the axial direction of a terminal is preferrably larger than the thickness of dielectric material in the axial direction of the cylindrical dielectric material.

Figure 3:
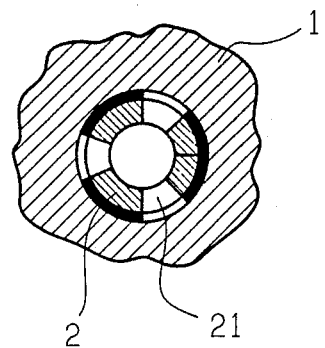
FIG. 3 is a sectional view of the soldered area of the essential portion of another embodiment of the present invention, namely the through terminal and dielectric material.

FIG. 3 is a sectional view of the essential portion of another embodiment of the present invention, namely the soldered area of the through terminal 2 and dielectric material 1. The through terminal 2 in this embodiment is formed into a pipe form by bending a flat plate, including a part to be inserted into a dielectric material 1 and a part for a receptacle to be engaged therewith (as 22 in FIG. 1). Slits are formed in the corresponding soldering area of the flat plate before being formed into a pipe form, and the sectional view similar to FIG. 2 can be obtained. Here, the similar effect can be achieved even in case the slits provided in the through terminal 2 are arranged in the axial direction or in the oblique direction (in spiral form) to the axial direction as shown in FIG. 2 and FIG. 3.

As explained previously, the present invention provides the effect that the slits provided in the hollow metal pipe wall of a through terminal brings about the flexibility to the through terminal itself without increase of processing steps and the equal division of soldering with the dielectric material in the circumferential direction prevents leak of high frequency waves of extremely short wavelengths from the magnetron used as the filter, while alleviating a thermal stress applied on the dielectric material.

What is claimed is:

1. A through-type capacitor providing a through hole in almost cylindrical dielectric material in parallel to the axis of said cylindrical material and forming electrodes by respectively metallizing the internal circumferential side wall surface of said through hole and external circumferential side wall surface of said dielectric material, comprising the structure that a hollow metal pipe is used as a through terminal inserted into a through hole, a plurality of slits are provided with an equal interval in the circumferential direction in the metal wall surface of said pipe inserted into the through hole and the metal wall surface of said pipe on the part of adjacent slits are respectively soldered to the electrode of internal circumferential side wall surface of said through hole for the connection.

2. A through-type capacitor according to claim 1, wherein a metal plate is used as a through terminal by rounding, after a plurality of slits are formed previously therein, in the form of a pipe.

3. A through-type capacitor according to claim 1, wherein the length of slits provided in the through terminal in the axial direction of said terminal is larger than the thickness of dielectric material in the axial direction thereof.

* * * * *